United States Patent
Klassen

(10) Patent No.: US 8,711,435 B2
(45) Date of Patent: Apr. 29, 2014

(54) METHOD FOR CORRECTING INTEGRATING CAVITY EFFECT FOR CALIBRATION AND/OR CHARACTERIZATION TARGETS

(75) Inventor: R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1804 days.

(21) Appl. No.: 11/268,294

(22) Filed: Nov. 4, 2005

(65) Prior Publication Data

US 2007/0103743 A1 May 10, 2007

(51) Int. Cl.
*H04N 1/407* (2006.01)
*H04N 1/38* (2006.01)
*H04N 1/00* (2006.01)
*H04N 1/60* (2006.01)

(52) U.S. Cl.
CPC ....... *H04N 1/00002* (2013.01); *H04N 1/00082* (2013.01); *H04N 1/6033* (2013.01); *H04N 1/00068* (2013.01); *H04N 1/4078* (2013.01)
USPC .......... 358/3.26; 358/1.9; 358/2.1; 358/1.14; 358/504; 358/505; 358/518; 358/520; 358/521; 358/463

(58) Field of Classification Search
CPC .......... H04N 1/00013; H04N 1/00015; H04N 1/00023; H04N 1/193; H04N 1/486; H04N 1/00737; H04N 1/02815; H04N 1/0285; H04N 1/02895; H04N 2207/10008; H04N 1/6033; H04N 1/00002; H04N 1/00087; H04N 1/00031; H04N 1/00063; H04N 1/00
USPC ................................. 358/400–498, 500–540
See application file for complete search history.

(56) References Cited

U.S. PATENT DOCUMENTS

| | | | |
|---|---|---|---|
| 4,473,298 A | 9/1984 | Sakamoto |
| 4,516,175 A | 5/1985 | Jung et al. |
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,080,340 A | 1/1992 | Hacknauer et al. |
| 5,095,342 A | 3/1992 | Farrell et al. |
| 5,159,395 A | 10/1992 | Farrell et al. |

(Continued)

FOREIGN PATENT DOCUMENTS

JP          08-275002          10/1996

OTHER PUBLICATIONS

Gaurav Sharma, "Show Through Cancellation in Scans of Duplex Printed Documents", IEEE Transactions on Image Processing, vol. 10, No. 5, May 2001.*

(Continued)

*Primary Examiner* — Richard Zhu
(74) *Attorney, Agent, or Firm* — Fay Sharpe LLP

(57) ABSTRACT

In one form, the method comprises obtaining scanned values of the image, scaling the scanned values to obtain scaled values, applying a non-linear correction function to the scaled values to obtain a first approximation of corrected reflectance values, filtering the corrected reflectance values by applying a piecewise Gaussian filter, applying the non-linear correction function to obtain a successive approximation of the corrected reflectance values, determining whether the successive approximation of the corrected reflectance values are sufficiently converged, selectively repeating the filtering and applying if the corrected reflectance values are insufficiently converged and selecting the corrected reflectance values for subsequent processing if the corrected reflectance values are sufficiently converged.

20 Claims, 3 Drawing Sheets

(56) References Cited

U.S. PATENT DOCUMENTS

| | | |
|---|---|---|
| 5,208,640 A | 5/1993 | Horie et al. |
| 5,272,511 A | 12/1993 | Conrad et al. |
| 5,303,064 A * | 4/1994 | Johnson et al. ............... 358/406 |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,543,940 A * | 8/1996 | Sherman ....................... 358/518 |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |
| 5,710,968 A | 1/1998 | Clark et al. |
| 5,748,330 A | 5/1998 | Wang et al. |
| 5,778,377 A | 7/1998 | Marlin et al. |
| 5,784,667 A | 7/1998 | Mestha et al. |
| 5,790,281 A * | 8/1998 | Knox et al. ................... 358/504 |
| 5,884,910 A | 3/1999 | Mandel |
| 5,995,721 A | 11/1999 | Rourke et al. |
| 6,059,284 A | 5/2000 | Wolf et al. |
| 6,125,248 A | 9/2000 | Moser |
| 6,241,242 B1 | 6/2001 | Munro |
| 6,297,886 B1 | 10/2001 | Cornell |
| 6,341,773 B1 | 1/2002 | Aprato et al. |
| 6,345,117 B2 | 2/2002 | Klassen |
| 6,384,918 B1 | 5/2002 | Hubble, III et al. |
| 6,441,923 B1 | 8/2002 | Balasubramanian et al. |
| 6,450,711 B1 | 9/2002 | Conrow |
| 6,457,032 B1 * | 9/2002 | Silver ............................ 708/315 |
| 6,476,376 B1 | 11/2002 | Biegelsen et al. |
| 6,476,923 B1 | 11/2002 | Cornell |
| 6,493,098 B1 | 12/2002 | Cornell |
| 6,537,910 B1 | 3/2003 | Burke et al. |
| 6,550,762 B2 | 4/2003 | Stoll |
| 6,554,276 B2 | 4/2003 | Jackson et al. |
| 6,577,925 B1 | 6/2003 | Fromherz |
| 6,607,320 B2 | 8/2003 | Bobrow et al. |
| 6,608,988 B2 | 8/2003 | Conrow |
| 6,612,566 B2 | 9/2003 | Stoll |
| 6,612,571 B2 | 9/2003 | Rider |
| 6,621,576 B2 | 9/2003 | Tandon et al. |
| 6,631,215 B1 * | 10/2003 | Shiau et al. ................... 382/260 |
| 6,633,382 B2 | 10/2003 | Hubble, III et al. |
| 6,639,669 B2 | 10/2003 | Hubble, III et al. |
| 6,760,056 B2 | 7/2004 | Klassen et al. |
| 6,775,029 B1 | 8/2004 | Wen et al. |
| 6,819,906 B1 | 11/2004 | Herrmann et al. |
| 6,925,283 B1 | 8/2005 | Mandel et al. |
| 6,959,165 B2 | 10/2005 | Mandel et al. |
| 7,489,799 B2 * | 2/2009 | Nilsen et al. ................... 382/100 |
| 2001/0033686 A1 | 10/2001 | Klassen |
| 2002/0067849 A1 | 6/2002 | Klassen et al. |
| 2002/0078012 A1 | 6/2002 | Ryan et al. |
| 2002/0103559 A1 | 8/2002 | Gartstein |
| 2003/0063302 A1 | 4/2003 | Munger et al. |
| 2003/0077095 A1 | 4/2003 | Conrow |
| 2004/0085561 A1 | 5/2004 | Fromherz |
| 2004/0085562 A1 | 5/2004 | Fromherz |
| 2004/0088207 A1 | 5/2004 | Fromherz |
| 2004/0136015 A1 | 7/2004 | Van de Capelle et al. |
| 2004/0150156 A1 | 8/2004 | Fromherz et al. |
| 2004/0150158 A1 | 8/2004 | Biegelsen et al. |
| 2004/0153983 A1 | 8/2004 | McMillan |
| 2004/0165199 A1 | 8/2004 | Klassen et al. |
| 2004/0216002 A1 | 10/2004 | Fromherz et al. |
| 2004/0225391 A1 | 11/2004 | Fromherz et al. |
| 2004/0225394 A1 | 11/2004 | Fromherz et al. |
| 2004/0246528 A1 | 12/2004 | Washio et al. |
| 2004/0247365 A1 | 12/2004 | Lofthus et al. |
| 2004/0252905 A1 | 12/2004 | Mizes et al. |
| 2004/0257595 A1 | 12/2004 | Sharma et al. |
| 2004/0264768 A1 | 12/2004 | Sharma et al. |
| 2004/0264769 A1 | 12/2004 | Sharma et al. |
| 2004/0264770 A1 | 12/2004 | Sharma et al. |
| 2004/0264771 A1 | 12/2004 | Sharma et al. |
| 2005/0036159 A1 | 2/2005 | Sharma et al. |

OTHER PUBLICATIONS

Hobbs et al, "Design of an integrating cavity absorption meter", Applied Optics vol. 38, No. 3, Jan. 20, 1999.*

Bala et al., "System Optimization in Digital Color Imaging", IEEE signal processing magazine, Jan. 2005.*

Morgan, P.F., "Integration of Black Only and Color Printers", Xerox Disclosure Journal, vol. 16, No. 6, Nov./Dec. 1991, pp. 381-383.

Desmond Fretz, "Cluster Printing Solution Announced", Today at Xerox (TAX), No. 1129, Aug. 3, 2001.

Keith Knox, "Integrating Cavity Effect in Scanners," Proceedings on IS&T/OSA Conference on Optics and Imaging in the Information Age, Rochester, pp. 156-158 (1996).

G. Sharma, S. Wang, D. Sidavanahalli and K. Knox, "The Impact of UCR on Scanner Calibration," in Proc PICS Conf., pp. 121-124, Portland, OR (1998).

V. Ostromoukhov, R.D. Hersch, C. Peraire, P. Emmel and I. Amidror, "Two Approaches in Scanner-Printer Calibration: Colorimetric Space-Based vs. Closed-Loop," in Proc SPIE 2170, pp. 133-142 (1994).

J. Hardeberg, "Desktop Scanning to sRGB," in IS&T and SPIE's Device Independent Color, Color Hardcopy and Graphic Arts V, San Jose, CA (Jan. 2000).

H. Haneishi, T. Hirao, A. Shimazu and Y. Miyake, "Colorimetric Precision in Scanner Calibration Using Matrices," in Proceedings of IS&T and SID'S $3^{rd}$ Color Imaging Conference: Color Science, Systems and Applications, pp. 106-108, Scottsdale, Arizona (Nov. 1995).

A.R. Rao, "Color Calibration of a Colorimetric Scanner Using Non-Linear Least Squares," in Proc. IS&T's 1998 PICS Conference, Portland, OR (May 1998).

J. Hardeberg, "Acquisition and Reproduction of Colour Images: Colorimetric and Multispectral Approaches," Doctoral Dissertation, l'Ecole Nationale Superieure des Telecommunications, Paris (1999).

U.S. Appl. No. 10/761,522, filed Jan. 21, 2004, Mandel, et al.
U.S. Appl. No. 10/785,211, filed Feb. 24, 2004, Lofthus, et al.
U.S. Appl. No. 10/881,619, filed Jun. 30, 2004, Bobrow.
U.S. Appl. No. 10/917,676, filed Aug. 13, 2004, Lofthus, et al.
U.S. Appl. No. 10/917,768, filed Aug. 13, 2004, Lofthus, et al.
U.S. Appl. No. 10/924,106, filed Aug. 23, 2004, Lofthus, et al.
U.S. Appl. No. 10/924,113, filed Aug. 23, 2004, deJong, et al.
U.S. Appl. No. 10/924,458, filed Aug. 23, 2004, Lofthus, et al.
U.S. Appl. No. 10/924,459, filed Aug. 23, 2004, Mandel, et al.
U.S. Appl. No. 10/933,556, filed Sep. 3, 2004, Spencer, et al.
U.S. Appl. No. 10/953,953, filed Sep. 29, 2004, Radulski, et al.
U.S. Appl. No. 10/999,326, filed Nov. 30, 2004, Grace, et al.
U.S. Appl. No. 10/999,450, filed Nov. 30, 2004, Lofthus, et al.
U.S. Appl. No. 11/000,158, filed Nov. 30, 2004, Roof.
U.S. Appl. No. 11/000,168, filed Nov. 30, 2004, Biegelsen, et al.
U.S. Appl. No. 11/000,258, filed Nov. 30, 2004, Roof.
U.S. Appl. No. 11/001,890, filed Dec. 2, 2004, Lofthus, et al.
U.S. Appl. No. 11/002,528, filed Dec. 2, 2004, Lofthus, et al.
U.S. Appl. No. 11/051,817, filed Feb. 4, 2005, Moore, et al.
U.S. Appl. No. 11/070,681, filed Mar. 2, 2005, Viturro, et al.
U.S. Appl. No. 11/081,473, filed Mar. 16, 2005, Moore.
U.S. Appl. No. 11/069,020, filed Feb. 28, 2005, Lofthus, et al.
U.S. Appl. No. 11/089,854, filed Mar. 25, 2005, Clark, et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore, et al.
U.S. Appl. No. 11/094,998, filed Mar. 31, 2005, Moore, et al.
U.S. Appl. No. 11/094,864, filed Mar. 31, 2005, de Jong, et al.
U.S. Appl. No. 11/095,872, filed Mar. 31, 2005, Julien, et al.
U.S. Appl. No. 11/102,355, filed Apr. 8, 2005, Fromherz, et al.
U.S. Appl. No. 11/084,280, filed Mar. 18, 2005, Mizes.
U.S. Appl. No. 11/109,566, filed Apr. 19, 2005, Mandel, et al.
U.S. Appl. No. 11/109,558, filed Apr. 19, 2005, Furst, et al.
U.S. Appl. No. 11/109,996, filed Apr. 20, 2005, Mongeon, et al.

(56) References Cited

OTHER PUBLICATIONS

U.S. Appl. No. 11/093,229, filed Mar. 29, 2005, Julien.
U.S. Appl. No. 11/102,899, filed Apr. 8, 2005, Crawford, et al.
U.S. Appl. No. 11/102,910, filed Apr. 8, 2005, Crawford, et al.
U.S. Appl. No. 11/115,766, filed Apr. 27, 2005, Grace.
U.S. Appl. No. 11/102,332, filed Apr. 8, 2005, Hindi, et al.
U.S. Appl. No. 11/136,959, filed May 25, 2005, German, et al.
U.S. Appl. No. 11/136,821, filed May 25, 2005, Robinson.
U.S. Appl. No. 11/122,420, filed May 5, 2005, Richards.
U.S. Appl. No. 11/137,634, filed May 25, 2005, Lofthus, et al.
U.S. Appl. No. 11/137,251, filed May 25, 2005, Lofthus, et al.
U.S. Appl. No. 11/137,273, filed May 25, 2005, Anderson, et al.
U.S. Appl. No. 10/945,600, filed Sep. 20, 2004, Yao.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/208,871, filed Aug. 22, 2005, Dalal et al.
U.S. Appl. No. 11/212,367, filed Aug. 26, 2005, Anderson et al.
U.S. Appl. No. 11/215,791, filed Aug. 30, 2005, Hamby et al.
U.S. Appl. No. 11/222,260, filed Sep. 8, 2005, Goodman et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/235,979, filed Sep. 27, 2005, Anderson et al.
U.S. Appl. No. 11/236,099, filed Sep. 27, 2005, Anderson et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/170,873, filed Jun. 30, 2005, Klassen.
U.S. Appl. No. 11/274,638, filed Nov. 15, 2005, Wu et al.
U.S. Appl. No. 11/287,177, filed Nov. 23, 2005, Mandel et al.
U.S. Appl. No. 11/291,860, filed Nov. 30, 2005, Willis.
U.S. Appl. No. 11/292,163, filed Nov. 30, 2005, Mandel et al.
U.S. Appl. No. 11/292,388, filed Nov. 30, 2005, Mueller.
U.S. Appl. No. 11/314,774, filed Dec. 21, 2005, Klassen.
U.S. Appl. No. 11/315,045, filed Dec. 22, 2005, Klassen.
U.S. Appl. No. 11/593,410, filed Nov. 6, 2006, Klassen.
U.S. Appl. No. 11/170,975, filed Jun. 30, 2005, Klassen.
Robert P. Herloski, "Analytical Computation of Integrating Cavity Effect," in proc. SPIE vol. 482, International Optical Design Conference, pp. 410-421, 1998.

* cited by examiner

METHOD FOR CORRECTING INTEGRATING CAVITY EFFECT FOR CALIBRATION AND/OR CHARACTERIZATION TARGETS

BACKGROUND

To compute a color characterization of a scanner for a particular medium, or to compute a color calibration of a printer using a scanner, an array of patches may be measured (using a scanner). The measurements of those patches, however, are affected by an integrating cavity effect (ICE). Therefore, the measurements do not accurately predict the reflectance of the page. As such, there is a desire to avoid the impact of integrating cavity effect (ICE), in a manner that takes into account the fact that patches are being processed.

By way of background, the adverse impact of the integrating cavity effect (ICE) in scanners has been identified. Keith Knox, "Integrating cavity effect in scanners", Proceedings on *IS&T/OSA Conference on Optics and Imaging in the Information Age*, Rochester, pp. 156-158 (1996), the disclosure of which is incorporated herein by reference in its entirety. In this regard, the integrating cavity effect (ICE) makes it appear that measured pixel values are closer to the values of their neighbors than if the reflectance values were independently measured. More particularly, when a target image is scanned, part of the light from the scanner that is reflected off the page is reflected back to the page because the cavities of the light emitting elements of the scanning device are typically reflective. Accordingly, the reflectance of the local region—not just the target of interest—impacts the apparent illumination. If this is not taken into account when measuring the scanner response to printed targets (whether for characterizing the scanner or a printer), unnecessary errors (likely to appear as noise) are introduced into the data. Integrating cavity effect does not affect all scanners; however, it is common on lower cost scanners, as the mirror responsible for the effect also reduces the power requirements of the lamp.

Knox's method, simply put, is to filter the full resolution raster image with a large averaging kernel, and use the filtered image in a formula expressing the real reflectance in terms of the measured reflectance at a pixel, the average reflectance in the vicinity of that pixel, and a single parameter. Knox requires that the average image changes slowly, which is generally a good assumption if the average is taken over a large enough area relative to the resolution.

Along these lines, previous approaches to address the adverse impact of the integrating cavity effect have taken two forms: changing the printed target or applying a raster based correction. Changing the printed target includes grouping similar colors together and repeating patches to effectively randomize surroundings. Knox provides a raster based approach, which requires a large filter and depends on the local average of reflectance values changing very slowly. Neither of these approaches gives a completely satisfactory result, however.

CROSS REFERENCE TO RELATED PATENTS AND APPLICATIONS

This application is related to U.S. application Ser. No. 11/170,873, filed on Jun. 30, 2005, entitled COLOR CHARACTERIZATION OR CALIBRATION TARGETS WITH NOISE-DEPENDENT PATCH SIZE OR NUMBER, by R. Victor Klassen and U.S. application Ser. No. 11/170,975, filed on Jun. 30, 2005, entitled METHOD AND SYSTEM FOR PROCESSING SCANNED PATCHES FOR USE IN IMAGING DEVICE CALIBRATION, by R. Victor Klassen, both of which are incorporated herein by reference in their entirety.

INCORPORATION BY REFERENCE

U.S. Pat. No. 5,790,281 is hereby incorporated herein by reference in its entirety.

BRIEF DESCRIPTION

In accordance with one aspect of the presently described embodiments, a method comprises obtaining scanned values of the image, applying a non-linear correction function to the scanned values to obtain a first approximation of corrected reflectance values, filtering the approximate corrected reflectance values and applying the non-linear correction function to obtain a successive approximation of the corrected reflectance values.

In accordance with another aspect of the presently described embodiments, the obtaining comprises scanning.

In accordance with another aspect of the presently described embodiments, the obtaining of scanned values comprises obtaining unscaled scanned values and scaling the unscaled scanned values.

In accordance with another aspect of the presently described embodiments, the first approximation is obtained using:

$$R^0(x) = \frac{M(x)}{1 + \alpha M(x)}$$

where R is reflectance, M is measured reflectance and alpha is a geometrically dependent parameter.

In accordance with another aspect of the presently described embodiments, the successive approximation is obtained using:

$$R^{i+1}(x) = M(x)(1 - \alpha G \circ R^i(x)),$$

where R is reflectance, M is measured reflectance, alpha is a geometrically dependent parameter, and G*R is an averaging kernel.

In accordance with another aspect of the presently described embodiments, the method further comprises applying a piecewise Gaussian filter.

In accordance with another aspect of the presently described embodiments, the method further comprises determining whether the successive approximation of the corrected reflectance values are sufficiently converged.

In accordance with another aspect of the presently described embodiments, the method further comprises selectively repeating the filtering and applying the nonlinear function if the corrected reflectance values are insufficiently converged.

In accordance with another aspect of the presently described embodiments, the method further comprises selecting the corrected reflectance values for subsequent processing if the corrected reflectance values are sufficiently converged.

In accordance with another aspect of the presently described embodiments, a method comprises obtaining values associated with the image, iteratively applying a non-linear correction function to the values to obtain an approximation of corrected reflectance values, and, selectively filtering the corrected reflectance values.

In accordance with another aspect of the presently described embodiments, the obtaining comprises scanning.

In accordance with another aspect of the presently described embodiments, the obtaining of values comprises obtaining unscaled values and scaling the unscaled values.

In accordance with another aspect of the presently described embodiments, a first approximation is obtained using:

$$R^0(x) = \frac{M(x)}{1 + \alpha M(x)}$$

where R is reflectance, M is measured reflectance and alpha is a parameter that depends on the geometry of the image acquisition device.

In accordance with another aspect of the presently described embodiments, a successive approximation is obtained using:

$$R^{i+1}(x) = M(x)(1 - \alpha G \circ R^i(x)),$$

where R is reflectance, M is measured reflectance, alpha is a geometrically dependent parameter, and G*R is an averaging kernel.

In accordance with another aspect of the presently described embodiments, the filtering comprises applying a piecewise Gaussian filter.

In accordance with another aspect of the presently described embodiments, the method further comprises determining whether successive approximation of the corrected reflectance values is sufficiently converged.

In accordance with another aspect of the presently described embodiments, the method further comprises selectively repeating the filtering and applying if the corrected reflectance values are insufficiently converged.

In accordance with another aspect of the presently described embodiments, the method further comprises selecting the corrected reflectance values for subsequent processing if the corrected reflectance values are sufficiently converged.

In accordance with another aspect of the presently described embodiments, a method comprises obtaining scanned values of the image, applying a non-linear correction function to the scanned values to obtain an approximation of corrected reflectance values, and, selectively applying a piecewise Gaussian filter to the corrected reflectance values.

In accordance with another aspect of the presently described embodiments, the obtaining comprises scanning.

In accordance with another aspect of the presently described embodiments, the obtaining of scanned values comprises obtaining unscaled scanned values and scaling the unscaled scanned values.

In accordance with another aspect of the presently described embodiments, a first approximation is obtained using:

$$R^0(x) = \frac{M(x)}{1 + \alpha M(x)}$$

where R is reflectance, M is measured reflectance and alpha is a geometrically dependent parameter that depends on the geometry of the image acquisition device.

In accordance with another aspect of the presently described embodiments, a successive approximation is obtained using:

$$R^{i+1}(x) = M(x)(1 - \alpha G \circ R^i(x)),$$

where R is reflectance, M is measured reflectance, alpha is a geographically dependent, and G*R is an averaging kernel.

DETAILED DESCRIPTION

A method of the presently described embodiments is patch-based, and hence, has a much lower resolution than the previously described approaches. Because of this lower resolution, a significantly smaller filter may be applied. In this regard, the filter is the same size in mm of the page; however, it involves significantly fewer "pixels", as it filters patch-sized pixels. The resolution is typically at least 60 times smaller (assuming 2.5 mm patches scanned at 600 spots per inch (spi)). Therefore, filtering is 3600 times as fast, for a general filter shape. If the image can be filtered first in one dimension, and then the filtered image can be filtered in the other dimension (producing the same result as if a two dimensional filter were used), we say that the filter is x-y separable. For an x-y separable filter, filtering is still 60 times as fast as if it were done at full resolution. The method of the present invention is iterative, requiring possibly as many as 5-10 iterations (depending on the nature of the scanner), but this is still substantially faster than the full resolution approach. The constraint of a slowly varying local average is also avoided.

The existence of the integrating cavity effect (ICE) is the result of an engineering compromise. To reduce power, the light from a lamp is focused on the page using a reflector cavity. This is true of most desktop scanners, and some higher end scanners as well. However, as will be seen, the reflector cavity is the cause of the additional reflections that cause the integrating cavity effect (ICE). Absent the reflective cavity, the integrating cavity effect (ICE) would not be an issue.

Figure 1:
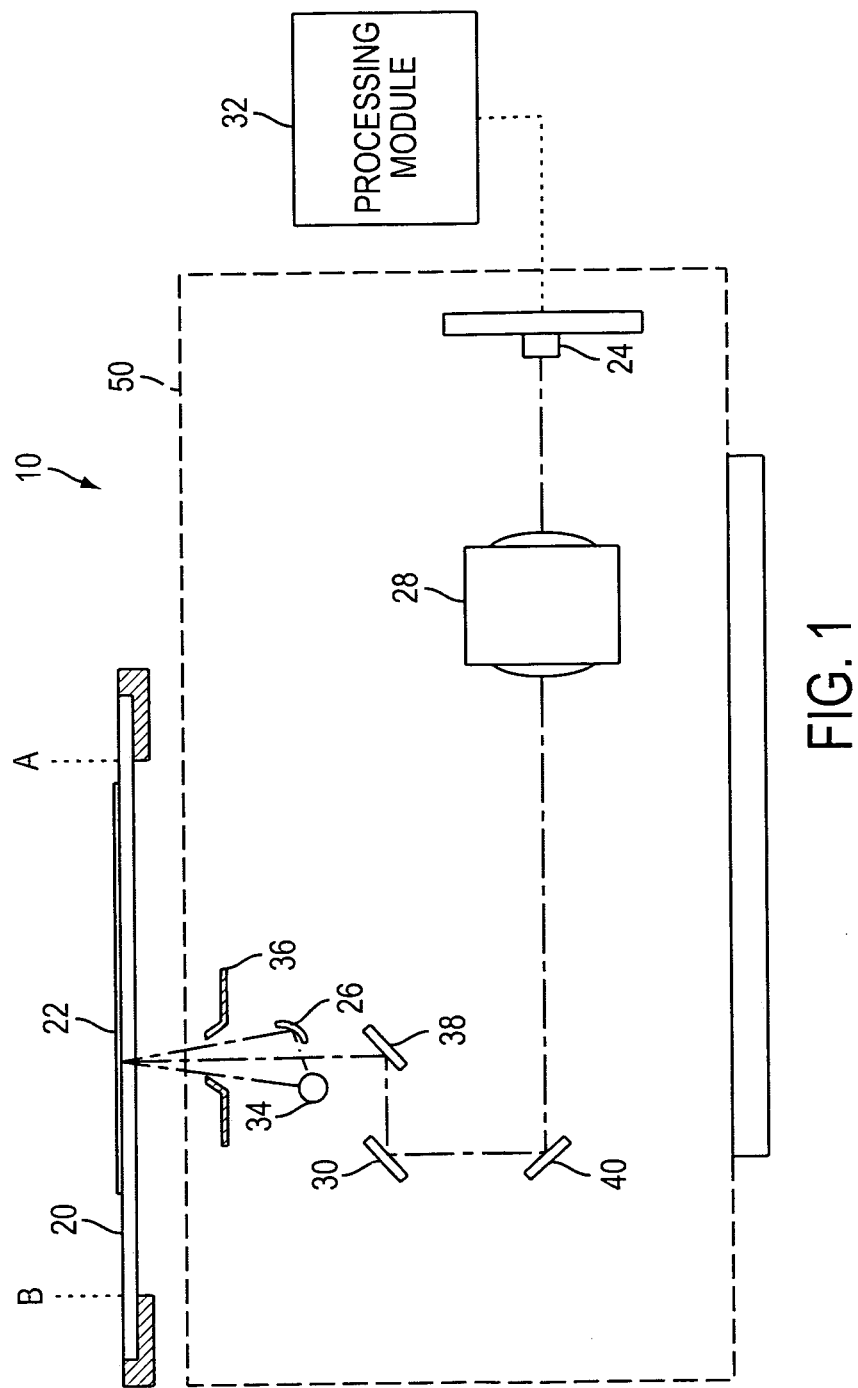
FIG. 1 is a representative view of a system into which the presently described embodiments may be implemented.

To illustrate, referring now to the drawings where the showings are for the purpose of describing an embodiment of the invention and not for limiting same, FIG. 1 represents one possible embodiment of a desktop scanner having an image acquisition device which may be used with the presently described embodiments. Although the presently described embodiments are described in conjunction with a desktop scanner, it may be possible to adapt it for use with other image acquisition devices, and the presently described embodiments are not limited to these embodiments.

Referring to FIG. 1, a desktop scanner 10 incorporates a transparent platen 20 on which a document 22 to be scanned is located. One or more photosensitive linear arrays 24 are supported for reciprocating scanning movement below platen 20. A scanning system assembly includes several optical components which move together as a single unit. These typically include a fluorescent lamp 34, an associated reflector 26 and a baffle 36, with the latter two elements cooperating to direct a narrow band of light onto a small area across the platen. Also included in the assembly are lens 28, and mirrors 30, 38 and 40, which operate together to focus the illuminated segment of platen 20 and the document being scanned thereon, onto array 24. Array 24 produces image signals or pixels representative of the image 42 present on the surface of document 22. These pixels are output to a display or storage device. The entire scanning system assembly is enclosed by cavity 50. Also shown is a processing module 32 in communication with the array 24. The processing module 32 may take a variety of suitable forms and may reside within the cavity 50 or outside the cavity 50. Further, the processing module 32 may be incorporated within the scanner or may reside on a system controlling the scanner.

Scanning array 24 may be a linear array of photosensitive sensors such as CCD's or photodiodes which are controlled to sense light reflected from a document during the illumination period. The photosensitive sensors develop a charge indicative of the amount of light detected, for transmission to an image processor for use in assimilating an electronically stored representation of image 42 contained in document 22. Scanning array 24 extends in a direction transverse to that of the motion of the carriage. This enables the carriage to move along an axis known to those skilled in the art as the "slow scan" axis, which begins at one end of the image and extends in the process direction towards the opposite end. The direction across the page in which the array extends is known as the fast scan axis.

Figure 2:
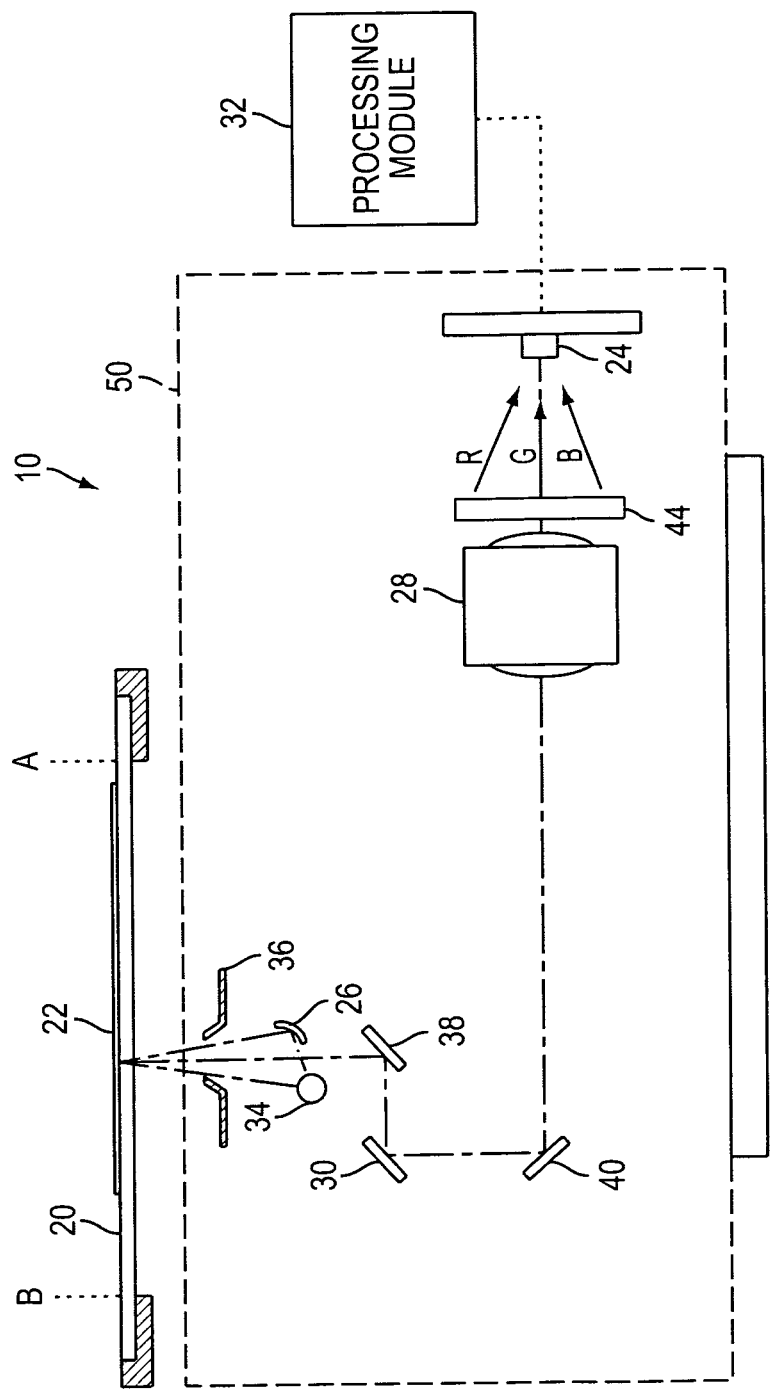
FIG. 2 is a representative view of a system into which the presently described embodiments may be implemented; and, FIG. 3 is a flow chart illustrating a method according to the presently described embodiments.

FIG. 2 shows the layout of a color scanner which may be used with the presently described embodiments. As shown, the illustration differs from the scanner depicted in FIG. 1 in that a color sensor 44 is located between lens 28 and photosensitive array 24. Color imaging is typically performed using various combinations of colors, most often three colors red, green and blue. The color sensor 44 includes one filter for each color that will be used by the device for generating images. Thus, once the light from lamp 34 passes through lens 28, it will reach color sensor 44, where it will be filtered into the separate color sources.

The reflector lamp assembly illustrated in FIGS. 1 and 2, e.g. the lamp 34, reflector 26 and baffle 36, serve as an "integrating cavity". As noted above, a fraction of the light hitting the paper is reflected back into the reflecting cavity. This light bounces back and forth. On each bounce, the light is more dispersed (in position) and less of it remains, as some is absorbed by the paper or misses the mirror. Moreover, other undesired reflections and bounces of light that impact the sensing or imaging of the image may occur within the cavity 50 to contribute to the integrating cavity effect.

To address the errors that are introduced into the data by this phenomenon, a method according to the presently described embodiments may be implemented. This method may be implemented in a variety of forms, including a suitable software routine (or combination of hardware and software routines) that utilizes hardware characteristics of the system being calibrated or the calibration/characterization system itself. Typically, the software routine will reside in and/or be executed by the module(s) (e.g. the processing module 32) that control the image acquisition device, e.g., a scanner, utilized to realize the objectives of the presently described embodiments. However, it will be appreciated that the precise form and implementation of the presently described embodiments may vary from application to application. For example, the subject software routines may reside in the digital front end (DFE) of a high speed image rendering device, such as a multi-function xerographic printer. It should also be appreciated that portions of the presently described embodiments may not be included for all applications. For example, scaling may not be used (as described below) or the various described functions of determining when a process should be completed (e.g. determining if the values are sufficiently converged) may not be used, may be used in modified form or may be replaced.

Figure 3:
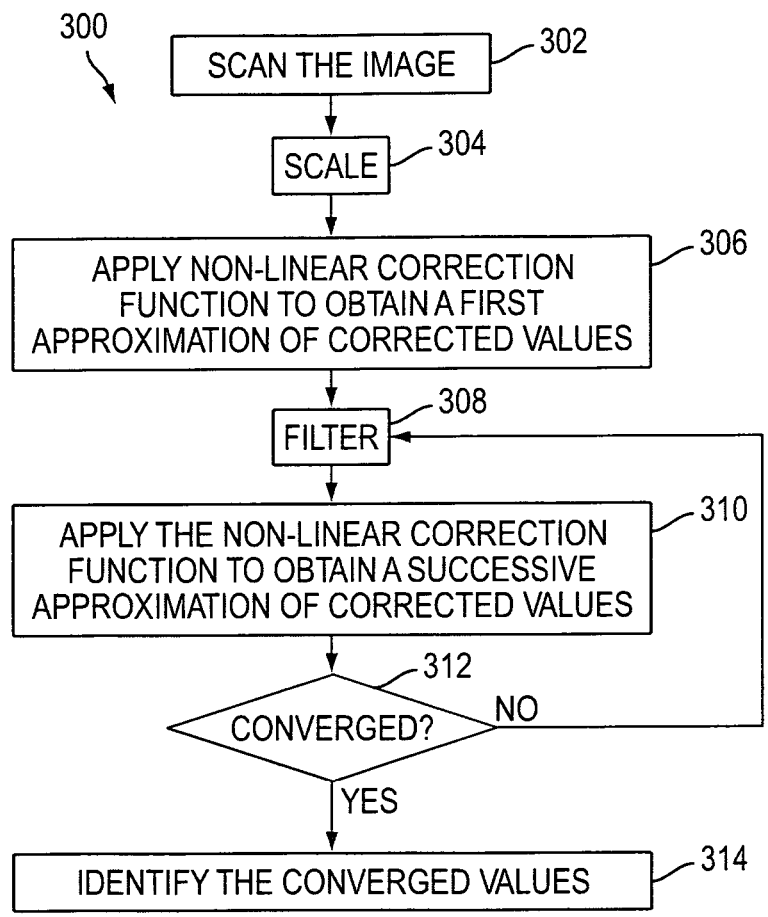

Referring now to FIG. 3, an overall method 300 is illustrated. As shown, the method is initiated upon the scanning of an image (at 302). Of course, for purposes of calibration and/or characterization, the image may comprise a series of test patches. Scanned values of the image, or portions of the image, are obtained as a result of the scanning. The scanned values of the image may also be retrieved from storage, depending on the time of the actual scan. In addition, values that represent scanned values (such as experimental, modified or scaled values) may be used.

Next, the scanned values may be scaled (at 304) down to form averages of regions that are either entire patches or integer fractions of patches. That is, the image, once scaled, contains only one or a small number of pixels per patch. Any suitable technique for scaling that obtains a value representative of an average value may be implemented. It should be understood that scaling is optional, depending on the objectives of the system and the available data and/or resources. Scanned values may be processed according to the presently described embodiments without scaling. Moreover, if scaling is performed, it may be considered to be part of the obtaining at 302.

A non-linear correction function is applied to the values (whether or not scaled) to obtain a first approximation of corrected reflectance values (at 306). The non-linear correction function and the first approximation will be described in more detail below. Next, the corrected (and approximate) reflectance values are filtered by applying a piecewise Gaussian filter (at 308). The filter parameters will be described in greater detail below.

The non-linear correction function is again applied to the filtered, corrected reflectance values to obtain a successive, e.g. a second, approximation of the corrected reflectance values (at 310). As above, the details of the non-linear correction function and the second approximation will be described below. A determination is then made as to whether the successive approximations of the corrected reflectance values are sufficiently converged (at 312). If not, the filtering and applying are repeated as many times as is necessary until the corrected reflectance values are sufficiently converged. As such, additional approximations may be calculated.

The corrected reflectance values are selected or identified for subsequent processing if the corrected reflectance values are sufficiently converged (at 314). Subsequent processing may include use of the values for whatever purpose the scan was, initiated. For example, the converged values may be stored for later use by the user or sent to or used within a printer section of a multi-function device. The number of such approximations and iterations of the process will be a function of the rate of convergence of the reflectance values and the desired values.

The mathematical details of the above method, or any other embodiment or method that incorporates the features of the presently described embodiments, will be described. In this regard, as noted above, the integrating cavity effect (ICE) is a result of additional reflections of light that impact measurements of reflectance of an image or portion of the image. This leads to an expression for the light striking the page that is an infinite series $$I = \sum_{k=0}^{\infty} (\alpha <R>)^k = \frac{1}{1 - \alpha <R>}, \tag{1}$$

where $<R> = G°R(x)$ is the local average reflectance, i.e. the reflectance convolved with some unknown averaging kernel G, α is a scaling factor related to the initial illumination and the mirror geometry, and I is the illumination at any given point. The apparent reflectance of a given location will then be $$M(x) = \frac{R(x)}{1 - \alpha G^\circ R(x)} \qquad (2)$$

Here M must be expressed in the same units as R. There is an implied normalization, in that the integral of G (or the sum of weights in a discrete representation) must be unity.

CCD based sensors are quite linear in their response to light, at least over the range used in scanners. However, as equation (2) shows, scanners will appear non-linear when used to measure the average reflectances of a collection of large constant patches. At all light levels, the denominator is less than one, corresponding to the fact that the illumination is higher than it would be in the absence of the integrating cavity effect (ICE), and the apparent reflectance is exaggerated. The extent of the exaggeration depends on the reflectance. Instruments designed for color measurement—as opposed to the scanners contemplated herein—do not typically experience integrating cavity effect (ICE), and hence measure the actual reflectance. As a result, no simple linear scale can be applied to scanner measurements to accurately match the reflectance as measured by an instrument.

One approach to correction for the integrating cavity effect (ICE) is to simulate the measurement of the reflectance by the scanner, presuming that a very small patch, surrounded by the darkest possible black, was measured. In the limit as the patch becomes smaller, the average surround approaches zero, and the denominator in equation (2) approaches 1. In practice, it is impossible to rearrange patches on a page so that all of the patches have a surround near black (and still have a reasonable number of non-black patches). Even if it were possible, the contributions of the patches themselves to the ICE would introduce some error.

If all the patches had sufficiently similar surroundings to their own values, equation (2) could be inverted by assuming G☐R(x)=R(x), but this would still be difficult near the edge of the page. Various other constraints are likely to prevent moving all the lightest patches to the perimeter.

In the same way, randomizing the surround of multiple instances of a patch does not produce an "average surround" that is black: it is more likely close to a mid-grey. Done thoroughly enough, the average surround of all representatives of a given patch color will approach a constant, and it might be possible to substitute a constant into the denominator of (2). However, this requires many repetitions of each patch. Page real estate for doing so would likely be better used otherwise. Hence, a correction approach is warranted.

Knox provided one method of correcting: assume that the local average reflectance is slowly varying, and calculate the reflectance from the local average of the measured values. The assumption of a slowly varying local average hinges on the width of the averaging kernel being large.

Herloski derives an approximate analytical expression for the integrating kernel, and in the example shown, the kernel exceeds 10% of its maximum value 40-60 mm from the centre. R. Herloski, "Analytical Computation of Integrating Cavity Effect," in proc. SPIE 3482 *International Optical Design Conference,* 1998, the disclosure of which is incorporated herein by reference in its entirety. For a 600 spot per inch scan, this represents a filter width of 1900-2800 pixels. The width of the filter depends on the scanning geometry (primarily the distance between the paper and the reflector), so it may not always be this large, but it is large enough at this resolution that the local average reflectance is well approximated as constant.

Herloski's expression for the shape of the kernel is separable (as the geometry would suggest), and based on a power series expansion of the integrand of a moderately complex integral. It is based on a simplified geometry and the resulting shape is well approximated by a Gaussian out to the point at which it becomes less than 0.25 of its original height. At this point 88% of the area under the kernel is accounted for. Herloski's expression matches a ray traced simulation of the same geometry to within 0.033, while the Gaussian fits Herloski's expression to within 0.06 over the entire range. In a comparison of ray traced vs. analytic for a less simplified geometry, the difference between analytic and ray traced is 0.11. Given that Herloski's expression is specific to the geometry in his simulation, it seems preferable to use the more empirical Gaussian shape. The shape of the filter is symmetric along the bar direction, and asymmetric along the direction of motion of the scan bar (perpendicular to the axis of the mirror). Using the Gaussian formulation, three parameters specify the shape of the filter: the horizontal/fast scan direction parameter, and vertical/slow scan "above" and "below" parameters.

Once a full averaging kernel is established, the process of reversing the integrating cavity effect by applying the further teachings of the presently described embodiments can be realized.

Notation: Let G*R=<R> be the convolution of the low pass filter kernel G with the signal R, also the local average of R.

Along these lines, assuming the average reflectance (i.e. G*R) varies slowly enough, we may compute it by assuming it is locally constant. Were the reflectance constant, it would be correct to re-write equation (2) as $$M(x) = \frac{R(x)}{1 - \alpha R(x)} \qquad (3)$$

Solving for R(x):

$$R^0(x) = \frac{M(x)}{1 + \alpha M(x)} \qquad (4)$$

This gives us a first approximation of the reflectance (as at 306 in FIG. 3), which we have superscripted with a 0. Note that M is in the 0 . . . 1 range, as is α. The denominator in (4) is therefore positive, and greater than one, and since the numerator is no greater than one the approximate reflectance is in the 0 . . . 1 range as is required by physical reality. From this approximation, we may compute an averaged reflectance <$R^0(x)$> as G*$R^0$ (This should use the weights that sum to 1 and not involve α). Now given an approximation $R^i$ to the reflectance, we can solve equation (2) for an improved approximation to the reflectance using the averaged reflectance just computed (as at 310 of FIG. 3), and the measured value at each pixel $$R^{i+1}(x)=M(x)(1-\alpha G^\circ R^i(x)), \qquad (5)$$

This may be repeated until the change in the image is small (as described in connection with 312 of FIG. 3). The rate of convergence depends on α. Generally the number of bits of precision increases by $-\log_2 \alpha$ at each iteration until numerical precision or measurement noise prevents further improvement.

With respect to the design of the filter that is used at 308 of FIG. 3, there are six parameters to consider: three geometry-independent parameters and three Gaussian spread parameters of the filter. Two of the Gaussian spread parameters relate to the slow scan direction and one relates to the fast scan direction.

The geometry-independent parameters will be discussed first. In a large white page, the reflectance will be the reflectance of white paper, $R_w$, while the measured value M will be a constant $M_w$. The reflectance being constant, the local average reflectance will be $R_w$ as well, so $$M_w = \frac{R_w}{1 - \alpha R_w} \quad (6)$$

Actual scanner values (as obtained at 302 of FIG. 3, for example) are not exactly the same as apparent reflectance values. The scanner reflectance values have been scaled (as at 304 of FIG. 3) so that some arbitrary white value maps to the maximum representable. That is, an eight bit scanner, that can potentially yield values in the 0 . . . 255 range, is unlikely to provide 255 in response to a perfectly reflective (R=1) surface, nor will it provide exactly 0 in response to a perfectly absorptive (R=0) surface, if such a surface were to exist. Thus the measured value $M=M_k+(M_w-M_k)S/255$. Given three or more values from large regions of constant (known) reflectance, we obtain for each such region $$M_k + \frac{S_i}{255}(M_w - M_k) = \frac{R_i}{1 - \alpha R_i} \quad (7)$$

or $$\left(1 - \frac{S_i}{255}\right) M_k + \frac{S_i}{255} M_w = \frac{R_i}{1 - \alpha R_i} \quad (8)$$

For any fixed $\alpha$, this may be solved as a matrix system. That is, $$\begin{bmatrix} 1 - S_1/255 & S_1/255 \\ 1 - S_2/255 & S_2/255 \\ \vdots & \vdots \\ 1 - S_N/255 & S_N/255 \end{bmatrix} \begin{bmatrix} M_k \\ M_w \end{bmatrix} = \begin{bmatrix} R_1/(1 - \alpha R_1) \\ R_2/(1 - \alpha R_2) \\ \vdots \\ R_N/(1 - \alpha R_N) \end{bmatrix}, \quad (9)$$

which may be solved using conventional (such as SVD) techniques.

Since $\alpha$ is in the 0 . . . 1 range, its value may be found by computing the solution to (9) for three tentative values ($\alpha_0$, $\alpha_1$, $\alpha_2$), and fitting a parabola to the residual at each of these values. If the parabola has a minimum in the range between the largest and smallest value of $\alpha$, that is the next trial location. It will either be between $\alpha_0$ and $\alpha_1$ or between $\alpha_1$ and $\alpha_2$. In either case, a new parabola may be fit using the new point and its two neighbors. At all times, an upper bound and a lower bound to the value of $\alpha$ corresponding to the minimum residual should be retained. If the newly fit parabola has a minimum outside the bounds, then the midpoint between the two values of $\alpha$ with the least residuals should be used as the new value. This should converge fairly rapidly, within 5-10 iterations (as contemplated by 312 of FIG. 3). Since $\alpha$ is only a parameter to be determined once for the scanner, the rate of convergence is of little consequence.

Reasonable values for these parameters put $M_k$ near 0, $\alpha$ in the 0 . . . 1 range (closer to 0 than to 1), and $M_w$ near 1. It is possible for $M_k$ to be slightly less than zero, as the scanner may be set up to give zero response for a dark but not perfectly black surface. At the same time, $M_w$ may be slightly greater than 1, if the scanner is set up to give a maximum response for 95% reflective paper, as an example. As a point of reference, office paper is rarely more than 90% reflective.

Suppose a solid black page, with a square block of nine white "patches" near the middle, is printed. Suppose an imaginary grid is super-imposed upon this page, whose grid resolution is the size of the white patches. In other words, a page has many "patches", all but nine of which are black. Further assume a super-grid of super-patches, the block of nine white patches composing one such super-patch. To eliminate errors due to printer non-uniformity, the page is measured using a densitometer at the low resolution grid, and then assumed that the high resolution grid is piecewise constant. We could also assume piecewise linear and interpolate (except at the white-black boundaries). Scanning the page (as at 302 of FIG. 3), and averaging over "patches" (the higher resolution ones), gives a set of scan values corresponding to the reflectances found using the densitometer. Filtering the (known) reflectance values (as at 308 of FIG. 3) and applying the expression of equation (2) gives an estimate of the measurements (as at 306 and 310 of FIG. 3). Comparing the actual measurements to the estimated measurements provides a measure of the conversion quality for the set of parameters for the filter. Optimizing the conversion quality by varying each of the three of the filter parameters in turn gives the optimum set of parameters. The parameters may be independently optimized. However, a far-from-optimum value for one of the parameters will make the result relatively insensitive to changes in another. The method of conjugate gradients may provide a global optimum more quickly.

In addition to the black page with a group of white patches in the centre, a white page with a group of black patches in the centre may be printed. The data from scanning and measuring this page can be combined with that from the fist page in the optimization. This doubles the quantity of input date, and improves robustness.

Correction of the integrating cavity effect in a color image acquisition device requires altering the expressions derived in the monochrome case, to account for each of the separate color sources. Where three colors, e.g. red, green and blue, are used to provide color images, three values of the fraction of light captured by the cavity and $M_w$, the calibrated reflectance values of white paper under the designated color, and three functions, g(x), which describe the distribution of the additional light over the document, must be obtained—one for each color red, green and blue.

The method according to the presently described embodiments was tested using prints made on a Xerox Phaser 7700 and scanned on a prototype scanner. The values of $M_k$, $M_w$, and a were computed from nine large patches on a single page approximately equally spaced. in reflectance. Values of −0.01157, 1.21078 and 0.2177 respectively provided the best fit. The RMS error between the actual reflectance and the reflectance predicted with the model was 0.0026, while the largest error was −0.0043. For comparison, when the best linear fit was found to convert from scanner measurements to reflectance, the RMS error was 0.0173, and the largest was 0.031, an order of magnitude worse.

The optimized Gaussian filter spanned seven pixels wide by five pixels high (using pixels of approximately 2.5 mm width). Using that filter on the black on white and white on black pages, and comparing the computed reflectances with the measured reflectances of the 81 patches in the centre (with the contrasting patches in the center of the 9 by 9 block), the residual error was 0.024 at the 95th percentile, 0.0089 RMS.

For comparison, a single pixel filter was used (equivalent to computing M/(1+αM) but not filtering and iterating), the error was 0.077 at the 95th percentile, and 0.026 RMS. Linearly scaling the measured values to obtain reflectances gave a 95th percentile error of 0.158, and 0.056 RMS. These values represent the worst case: one would expect that the arrangement of patches would be unlikely to create such large errors. However, the largest error could easily be half as large as these.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

In addition, the claims can encompass embodiments in hardware, software, or a combination thereof.

The invention claimed is:

1. A method of correcting measured reflectance of an image acquired by an image acquisition device having an integrating cavity, the method comprising:
    obtaining scanned values of the image;
    applying a non-linear correction function to the scanned values to obtain a first approximation of corrected reflectance values;
    filtering the approximate corrected reflectance values using a piecewise Gaussian filter; and,
    applying the non-linear correction function to obtain a successive approximation of the corrected reflectance values, wherein the successive approximation is obtained using:
    $$R^{i+1}(x)=M(x)(1-\alpha G°R^i(x)),$$
    where R is reflectance, M is measured reflectance, alpha is a geometrically dependent parameter, and G*R is an averaging kernel.

2. The method as set forth in claim 1 wherein the obtaining comprises scanning.

3. The method as set forth in claim 1 wherein the obtaining of scanned values comprises obtaining unscaled scanned values and scaling the unscaled scanned values.

4. The method as set forth in claim 1 wherein the first approximation is obtained using:
$$R^0(x) = \frac{M(x)}{1+\alpha M(x)}$$
where R is reflectance, M is measured reflectance and alpha is a parameter that depends on the geometry of the image acquisition device.

5. The method as set forth in claim 1 further comprising determining whether the successive approximation of the corrected reflectance values are sufficiently converged.

6. The method as set forth in claim 1 further comprising selectively repeating the filtering and applying the nonlinear function if the corrected reflectance values are insufficiently converged.

7. The method as set forth in claim 1 further comprising selecting the corrected reflectance values for subsequent processing if the corrected reflectance values are sufficiently converged.

8. A method of correcting measured reflectance of an image acquired by an image acquisition device having an integrating cavity, the method comprising:
    obtaining values associated with the image;
    iteratively applying a non-linear correction function to the values to obtain an approximation of corrected reflectance values wherein a first approximation is obtained using:

$$R^0(x) = \frac{M(x)}{1+\alpha M(x)}$$

where R is reflectance, M is measured reflectance and alpha is a parameter that depends on the geometry of the image acquisition device, and wherein a successive approximation is obtained using:
$$R^{i+1}(x)=M(x)(1-\alpha G°R^i(x)),$$
where G*R is an averaging kernel; and,
    selectively filtering the corrected reflectance values using a piecewise Gaussian filter.

9. The method as set forth in claim 8 wherein the obtaining comprises scanning.

10. The method as set forth in claim 8 wherein the obtaining of values comprises obtaining unscaled values and scaling the unscaled values.

11. The method as set forth in claim 8 further comprising determining whether successive approximation of the corrected reflectance values is sufficiently converged.

12. The method as set forth in claim 11 further comprising selectively repeating the filtering and applying if the corrected reflectance values are insufficiently converged.

13. The method as set forth in claim 11 further comprising selecting the corrected reflectance values for subsequent processing if the corrected reflectance values are sufficiently converged.

14. A method of correcting measured reflectance of an image acquired by an image acquisition device having an integrating cavity, the method comprising:
    obtaining scanned values of the image;
    scaling the scanned values to obtain scaled values;
    applying a non-linear correction function to the scaled values to obtain an approximation of corrected reflectance values, wherein a first approximation is obtained using:

$$R^0(x) = \frac{M(x)}{1+\alpha M(x)}$$

where R is reflectance, M is measured reflectance and alpha is a geometrically dependent parameter that depends on the geometry of the image acquisition device, and wherein the non-linear correction function is applied to obtain a successive approximation using:
$$R^{i+1}(x)=M(x)(1-\alpha G°R^i(x)),$$
where G*R is an averaging kernel; and,
    selectively applying a piecewise Gaussian filter to the corrected reflectance values.

15. The method as set forth in claim 14 wherein the obtaining comprises scanning.

16. A method of correcting measured reflectance of an image acquired by an image acquisition device having an integrating cavity, the method comprising:
    obtaining scanned values of the image;
    applying a non-linear correction function to the scanned values to obtain a first approximation of corrected reflectance values;

filtering the approximate corrected reflectance values; and,
applying the non-linear correction function to obtain a successive approximation of the corrected reflectance values, wherein the successive approximation is obtained using:

$$R^{i+1}(x)=M(x)(1-\alpha G^\circ R^i(x)),$$

where R is reflectance, M is measured reflectance, alpha is a geometrically dependent parameter, and G*R is an averaging kernel.

17. A method of correcting measured reflectance of an image acquired by an image acquisition device having an integrating cavity, the method comprising:
  obtaining scanned values of the image;
  applying a non-linear correction function to the scanned values to obtain a first approximation of corrected reflectance values, wherein the first approximation is obtained using:

$$R^0(x) = \frac{M(x)}{1+\alpha M(x)}$$

where R is reflectance, M is measured reflectance and alpha is a parameter that depends on the geometry of the image acquisition device;
  filtering the approximate corrected reflectance values; and,
  applying the non-linear correction function to obtain a successive approximation of the corrected reflectance values, wherein the successive approximation is obtained using:

$$R^{i+1}(x)=M(x)(1-\alpha G^\circ R^i(x)),$$

where R is reflectance, M is measured reflectance, alpha is a geometrically dependent parameter, and G*R is an averaging kernel.

18. The method as set forth in claim 16 wherein the obtaining of scanned values comprises obtaining unscaled scanned values and scaling the unscaled scanned values.

19. A system for correcting measured reflectance of an image affected by an integrating cavity, the system comprising:
  a scanner operative to obtain scanned values of the image; and,
  a processor operative to apply a non-linear correction function to the scanned values to obtain a first approximation of corrected reflectance values, filter the approximate corrected reflectance values using a piecewise Gaussian filter and apply the non-linear correction function to obtain a successive approximation of the corrected reflectance values, wherein the successive approximation is obtained using:

$$R^{i+1}(x)=M(x)(1-\alpha G^\circ R^i(x)),$$

where R is reflectance, M is measured reflectance, alpha is a geometrically dependent parameter, and G*R is an averaging kernel.

20. The system as set forth in claim 19 wherein the first approximation is obtained using:

$$R^0(x) = \frac{M(x)}{1+\alpha M(x)}$$

where R is reflectance, M is measured reflectance and alpha is a parameter that depends on the geometry of the image acquisition device.

* * * * *